United States Patent [19]

Hughes

[11] 4,179,894
[45] Dec. 25, 1979

[54] DUAL SOURCE HEAT PUMP

[75] Inventor: Hugh M. Hughes, Fort Lauderdale, Fla.

[73] Assignee: Wylain, Inc., Dallas, Tex.

[21] Appl. No.: 865,187

[22] Filed: Dec. 28, 1977

[51] Int. Cl.² .............................................. F25B 13/00
[52] U.S. Cl. ........................................ 62/2; 62/160; 62/199; 237/2 B
[58] Field of Search ............... 62/324, 79, 238 E, 183, 62/2, 199, 160; 237/2 B

[56] References Cited

U.S. PATENT DOCUMENTS

| | | | |
|---|---|---|---|
| 2,575,325 | 11/1951 | Ambrose et al. | 62/238 |
| 2,584,573 | 2/1952 | Gay | 62/324 X |
| 2,689,090 | 9/1954 | Wetherbee et al. | 237/1 A |
| 4,030,312 | 6/1977 | Wallin et al. | 62/2 |

Primary Examiner—William E. Wayner
Attorney, Agent, or Firm—Lane, Aitken & Ziems

[57] ABSTRACT

A dual source heat pump system is disclosed for automatically selecting in either the heating or cooling mode of operation that source which will most efficiently meet the heating or cooling demand required of the system. The heat pump system includes valves located so that the heat exchanger associated with the source not selected can be isolated from the remainder of the system and temporary pumping cycles initiated at the conclusion of a heating or cooling cycle for pumping all the refrigerant into the indoor space exchanger coil. Virtually all the refrigerant charge is thereby maintained in the active portions of the heat pump system while the inactive portion is completely isolated.

20 Claims, 5 Drawing Figures

DUAL SOURCE HEAT PUMP

BACKGROUND OF THE INVENTION

The present invention relates to air conditioning systems of the heat pump type and particularly to an improved dual source air conditioning and heating system which automatically selects in either the heating or cooling mode of operation the most efficient source for meeting the heating or cooling requirements of the system.

It is well known in the art that reversible air conditioning systems of the heat pump type operate by transfer of heat across an outdoor heat exchanger coil to either reject or absorb heat from the ambient air in order to provide cooling or heating to air circulated across an indoor space heat exchanger coil. In systems of this type, however, the heating capacity becomes very poor at low outside temperatures and the system cannot, therefore, supply the increased heating demand. Under these weather conditions, such prior art heat pump systems have found it necessary to include backup heating systems, such as electrical resistance heating, to supply the necessary heat when outside temperatures fall below acceptable levels. Another disadvantage of such prior art heat pump systems is that when the outdoor air temperature approaches freezing, frost build-up on the outside coil reduces the amount of air passing over the coil. As a result, the efficiency of such systems is greatly reduced during cold weather conditions.

The use of water as a source of heat is also well known, but in many instances, sufficient quantities of water are not readily available. It is possible to use a closed loop water system where the water is recirculated if an external source of heat, e.g. solar, is readily available. The closed loop system makes the rejection of heat difficult during the cooling mode operation of the heat pump.

Reversible refrigeration systems have also operated by transfer of heat across a heat exchanger in association with a supply of water wherein heat is discharged or absorbed from the water in a manner similar to air source heat pumps. The heating capacity of such systems likewise becomes very poor as the water temperature decreases. When such water source systems are utilized over long periods of time when the heating demand is great, the temperature of the water will decrease rapidly towards freezing. The water, which is usually heated by means of solar energy, will therefore be unable to supply the increased heating demand of the system. Water source heat pumps have, therefore, found it necessary to utilize back-up heating systems. Such back-up systems have included an outdoor air heat exchanger which operates when the temperature of the water source falls below a preset minimum temperature. Once the water temperature increases to or above this minimum temperature due to additional solar heating, the system will switch back to the water source heat exchanger and deactivate the air-source exchanger. Such systems, however, operate primarily as water source heat pumps, irrespective of the relative temperatures of the water source and ambient air, and therefore, irrespective of which source will provide more efficient operation.

In addition, such prior art heat pumps do not completely isolate the heat exchanger not in use from the active portions of the system since refrigerant may still be permitted to flow into the inactive heat exchanger. Further, refrigerant previously pumped into a heat exchanger will remain there even though the heat exchanger is not subsequently active in the system. This results in a reduction of the total refrigerant charge supplied to active portions of the system and causes the heat pump to operate at reduced efficiency.

In order to avoid the deleterious effects of frost build-up on the outside heat exchanger or coil when the ambient air temperature approaches freezing, prior systems have included various heating mechanisms to melt the ice. One such method has included reversing the cycle of the heat pump (switching to cooling mode of operation) so that the outdoor coil will function as a condenser containing compressed high pressure gas from the compressor to thereby melt the frost build-up.

SUMMARY OF THE INVENTION

The heat pump air conditioning system of the present invention obviates the disadvantages of the prior art systems by providing a dual source of, for example, either water or air and automatically selecting that source which will most efficiently supply the heating or cooling requirements of the system depending upon the relative temperatures of the ambient air and the water source, irrespective of the absolute temperature of either source. Furthermore, the system of the present invention provides temporary pump-down cycles to pump virtually all the refrigerant from both the water and ambient air heat exchangers into the indoor space heat exchanger each time the unit shuts down after a heating or cooling cycle. By also providing valves to isolate the inactive heat exchanger, the outside air coil will be completely isolated from the active portions of the system whenever the ambient air temperature approaches freezing. The total refrigerant charge is also thereby maintained in the active portions of the system since all refrigerant charge will then be supplied only to the active portions of the system at the commencement of a heating or cooling cycle, there being virtually no residual refrigerant charge in the isolated, inactive heat exchanger.

It is, therefore, an object of the present invention to provide an improved dual source heat pump system which can automatically select the most efficient source regardless of the absolute temperature of either source.

Another object of the present invention is to provide an improved dual source heat pump system which can isolate inactive portions of the system.

Yet another object of the present invention is to provide an improved dual source heat pump wherein all the refrigerant charge is pumped into the indoor spce heat exchanger at the conclusion of each heating or cooling cycle so that the total refrigerant charge is always available to the active portions of the system.

These and still other advantages of the present invention will become more apparent by reference to the drawings and a review of the detailed written description of the invention.

DETAILED DESCRIPTION OF THE PREFERRED EMBODIMENT OF THE PRESENT INVENTION

Figure 1A:
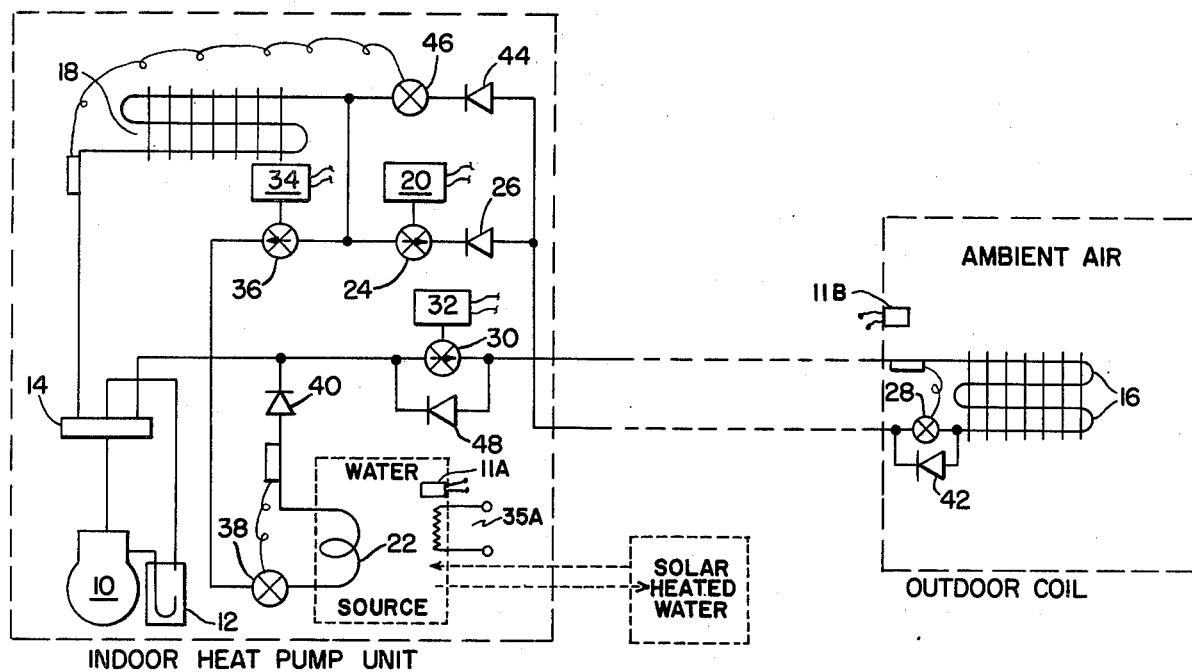
FIG. 1A is a schematic diagram of the preferred embodiment of the dual source heat pump according to the present invention.
Figure 1B:
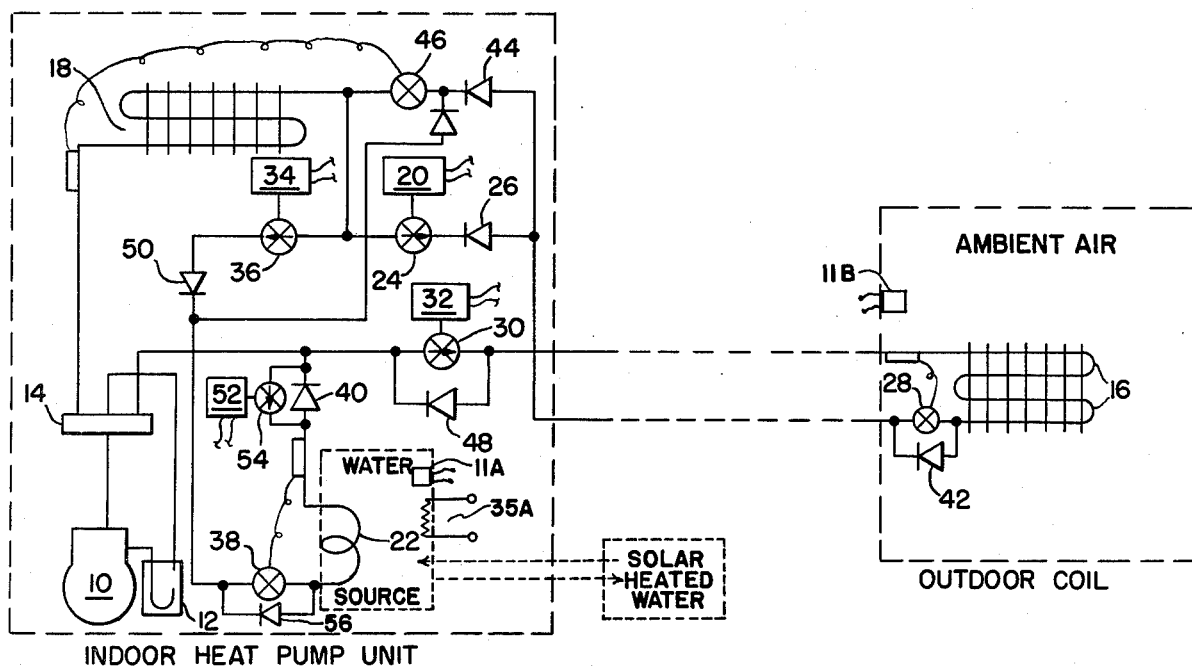
FIG. 1B is a schematic diagram of another embodiment which includes the use of the water as a heat sink when the heat pump operates in the cooling mode.

Referring to FIGS. 1A and 1B, there is shown a refrigerant compressor 10, a reversing valve 14 and optionally a suction gas accumulator 12. The reversing valve 14 is a four-way valve that is capable of selectively directing the flow of refrigerant to either the outdoor coil 16 or the indoor coil 18 to set the system for cooling or heating operations, respectively. In order to understand more clearly the operation of the dual source heat pump illustrated in FIG. 1A in both its heating and cooling modes of operations, FIG. 1A and the circuit diagram of FIG. 2 will now be described for each mode.

In the heating mode of operation, the compressor 10 discharges high pressure refrigerant gas into the reversing valve 14 which diverts the hot gas into the indoor coil 18 where it is condensed. The heat removed from the condensed refrigerant is then transferred to the air for circulation through the building by means of a blower (not shown). The condensed refrigerant, now in its liquid phase, will then flow to either the outside coil 16 or the indoor heat exchanger 22 depending upon the relative temperature of the air and water sources. the discriminator temperature switch (DTS) 11 senses the relative temperatures of the water source by means of sensor 11A and the air by means of sensor 11B and determines which source will permit the most efficient heating or cooling operation, irrespective of the absolute temperature of either source. DTS types of switches are commercially available, i.e., the Robertshaw SD-10 differential temperature switch, and are readily adaptable for operation in the present invention.

If use of the outside ambient air as a heat source will provide more efficient operation than the water source, DTS 11 will make contact with the line to the air temperature switch (ATS) 21 and, consequently, both a first liquid solenoid ($LLS_1$) 20 and the condenser fan contactor 23 will be energized through the $ATS_2$ 21. The advantage in using a DTS switch rather than a water temperature switch (WTS) as in the prior art is that it allows operation of the most efficient source regardless of the absolute temperature of either whereas with the WTS, the water source must be the primary mode and air only used when water at acceptable temperature levels is not available. The condensed liquid refrigerant will then flow from the indoor coil 18 through a solenoid valve 24 and a check valve 26. The liquid refrigerant continues through a metering device, such as an expansion valve 28 to the outdoor coil 16 which functions as an evaporator. At this point, heat is absorbed into the system from the outdoor air, raising the temperatures of the refrigerant and subsequently gasifying the refrigerant. The refrigerant gas then flows from the outdoor coil 16 through another check valve 48 to the reversing valve 14 and into the suction gas accumulator 12. The refrigerant gas then continues to the compressor 10 where it is compressed and the high pressure gas is returned to the reversing valve 14 where it is directed into the indoor coil 18 to repeat the cycle described above.

Figure 2:
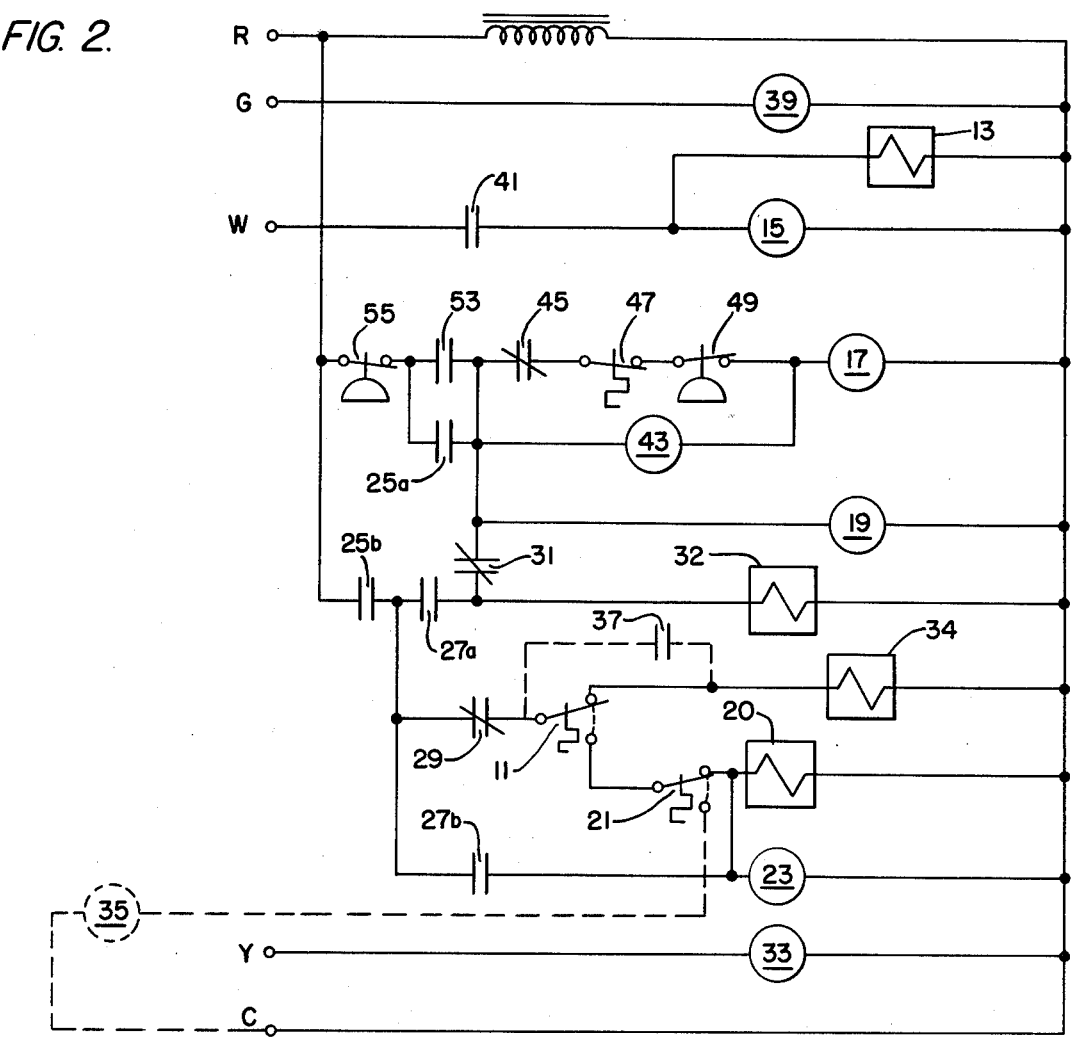
FIG. 2 is a schematic circuit diagram of the electrical control system for the dual source heat pump of the present invention as shown in FIG. 1A.

If, however, the DTS 11 has determined that the water source will provide for a more efficient heating operation for the heat pump, the DTS 11 will switch to make contact with the line to a liquid line solenoid ($LLS_1$) 20 as shown in FIG. 2.

The unit now will operate as a water source heat pump as long as the DTS 11 indicates that the temperature of the water, when compared to the air, will provide a more efficient heating operation utilizing the water source. In this mode of operation, the high pressure refrigerant gas discharge from the compressor 10 through the reversing valve 14 flows into the indoor coil 18 where it is condensed. The heat removed from the condensed refrigerant is transferred to the inside air for circulation by the blower (not shown) through the area of the building requiring heat.

The liquid refrigerant is then diverted from the indoor coil 18 through a solenoid valve 36 and flows to the indoor heat exchanger 22 by way of another expansion valve 38. The heat exchanger 22 may be of any conventional type for exchanging heat with a water source, such as a shell and tube type or coaxial type heat exchanger acting as an evaporator. At this point, heat is absorbed by the gas refrigerant into the heat exchanger 22 from the water source.

After passing through the indoor heat exchanger 22, the refrigerant gas flows through a check valve 40, back to the reversing valve 14 and into the suction gas accumulator 12. The refrigerant gas then continues to the compressor 10 where it is compressed and high pressure gas returned to the reversing valve 14 where it is diverted into the indoor coil 18 to repeat the cycle described above.

Figure 3:
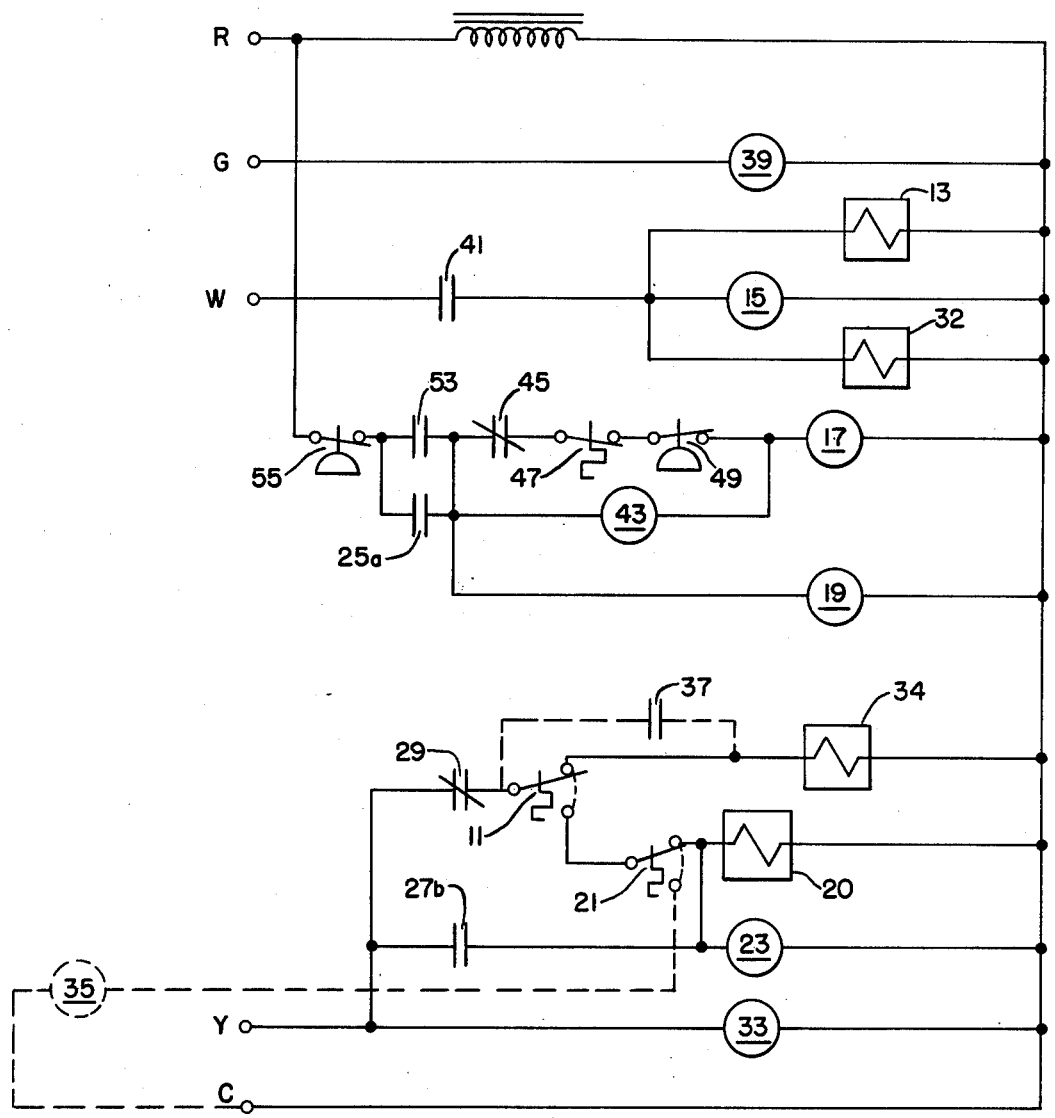
FIG. 3 is a modified electrical control system for the schematic diagram illustrated in FIG. 2.

The room thermostat is connected to terminals R, G, W and Y (see FIGS. 2 and 3). The room thermostat is of a commercially available type and serves to connect R to Y on a demand for either heating or cooling and to connect R to W only on a demand for cooling. R is connected to G on heating, cooling or when manually switched for continuous fan operation.

In the heating mode of operation on either the air or water source mode, relay coil 33 is energized (refer to FIG. 2) which controls relay contacts 25a, 25b, 31 and 41. The closing of contacts 25a will then energize the compressor contactor 17 and the holding relay 19. The closing of contacts 25b completes the circuit to DTS 11 through the cooling relay contacts 29. Where the temperatures difference between the ambient air and the water source is such that the water source is the more efficient mode of operation, the DTS 11 will switch to complete the electrical circuit through the $LLS_2$ 34. Conversely, if the air source is a more efficient mode, the DTS will switch to energize $LLS_2$ 34 and the outdoor coil fan contactor 23.

In the circuit shown herein, an air temperature switch (ATS) 21 is included to preclude the operation on the air source mode when the outdoor temperature is at a level low enough to cause a build-up of frost on the outdoor coil 16. An alternate approach would be to allow operation at these lower temperatures and incorporate defrost means as is done on many commercially available air to air heat pumps.

It should be noted at this time that the circuit described in FIGS. 2 and 3 is provided with an electric heat relay 35 and contacts 37 shown connected to the circuit by dashed lines. These may be utilized to provide heat if both the ambient air and the water sources are too cold for satisfactory operation. One method is to heat the water supply source by means of resistance heat 35A utilizing relay 35. The other is to heat the circulating indoor air directly by means of resistance heaters. The latter method would require contacts 37 to energize the LLS$_2$ 34.

The water supply source may be also heated by means of solar energy. By this method, the water is located in a storage tank into which heat is added from a solar collector array (not shown).

Turning now to the cooling mode of operation for the heat pump of the present invention and referring to the circuit diagram of FIG. 2, the blower relay 39 is energized through terminal G, the compressor relay 33 through a terminal Y, and the reversing valve solenoid 13 and cooling relay 15 through a contact 41 of the compressor relay 33 and a terminal W. The compressor contactor 17 is energized through contacts 25a, impedance relay contacts 45, and the low temperature switch (LTS) 47 and high pressure switch (HPS) 49. The holding relay 19 latches onto itself electrically through its own contacts 53 and the HGS 32 is also energized as is the LLS$_1$ 20 and outside fan contactor 23.

Referring again to FIG. 1A, the high pressure gas refrigerant flows from the compressor 10 through the reversing valve 14 which directs the hot gas through the solenoid valve 30, to the outdoor coil 16, now acting as a condenser. At this point, heat is extracted by the flow of air through coil 16 condensing the refrigerant. The condensed high pressure liquid refrigerant is then directed through check valves 42 and 44 and through a thermal expansion valve 46 into the indoor coil 18 now acting as an evaporator. The low pressure gas absorbs the heat from the indoor air blown across coil 18 and carries it through the reversing valve 14 where it is directed into the suction gas accumulator 12. The low pressure gas is then returned to the compressor 10, where it is compressed and high pressure gas returned to the reversing valve 14 for direction into the outdoor coil 16 starting the cycle described above over again.

Although cooling utilizing the water source will not ordinarily be necessary according to the present invention, the same may be also accomplished as described below. Referring to FIG. 1B, the compressor 10 discharges high pressure refrigerant gas into the reversing valve 14 which directs the hot gas to a second HGS 54 controlled by solenoid coil 52. If the DTS 11 has determined that the temperature of the water source will provide for more efficient cooling operation by virtue of the relatively higher ambient air temperature, the HGS 54 will then divert the hot gas refrigerant into the indoor heat exchanger 22. At this point, heat is extracted from the high pressure gas through the flow, for example, of cool water around the indoor heat exchanger 22, now operating as a condenser. The condensed high pressure liquid flows through check valves 56 and 58 into the thermal expansion valve 46. the gas continues through expansion valve 46 and into the indoor coil 18 now operating as an evaporator. The low pressure gas picks up heat from the inside air circulating along the coil 18 and carries the heated refrigerant through reversing valve 14 where it is directed to the suction gas accumulator 12 and returned to the compressor 10. The low pressure refrigerant gas is then compressed and is returned as high pressure gas to the reversing valve 14 to repeat the above-described cycle. Check valve 50 is also added to block flow which could leak through the solenoid valve 36 and bypass expansion valve 46.

If the water supplying the water source heat exchanger is outside the proper operating temperature for efficient water source heat pump operation (e.g., above about 85° F.), the DTS 11 will sense this and activate the HGS 32 to divert the refrigerant gas flow to the outdoor condenser coil 16. The operation of the heat pump is thus automatically changed to the air source much in the same way as in the heating modes of operation.

The circuit shown in FIG. 3 is essentially the same as FIG. 2 except that it has been simplified to relocate the HGS as shown, thereby eliminating the need for several relay contacts such as 25b, 27a and 31. the operation of FIG. 3 is, however, then identical to that described in connection with FIG. 2.

The heat pump described above in connection with FIGS. 1-3 also utilizes temporary cooling and heating pump down cycles. These temporary pump down cycles are important and necessary to compensate for the slow leakage that is inevitable through the expansion valves, check valves, and solenoid valves of the system. It is believed that in order to have a system which will function satisfactorily over an extended period of time, it is necessary to control the refrigerant charge and, in fact, maintain the complete charge active in the system.

This is accomplished in the present invention by locating a combination of solenoid and check valves to isolate the inactive portions of the system. Furthermore, the pump down cycles act to pump all the refrigerant into the indoor coil 18 each time the unit is shut down after any heating or cooling cycle. The indoor coil is utilized as such since it is the single heat exchanger which is always active in the system regardless whether a water or air source mode is selected. The pump down at the end of each operating cycle then "renews" the system by pumping all the refrigerant out of the other two heat exchangers and into the indoor coil 18 so that the entire active refrigerant charge will be available for the next heating or cooling cycle. The description of the pump down cycle follows.

At the end of a cooling cycle operation, terminal Y is de-energized inside a thermostat (not shown) causing compressor relay 33 to be de-energized. Terminal W is still energized through the "cool" selector switch on the thermostat. Terminal G may or may not be energized depending whether the thermostat fan selector is in the "auto" or "on" position. The blower motor stays energized through contact on the compressor contactor 17. The reversing valve solenoid 13 and the cooling relay 15 are de-energized due to the opening of contacts 41, 25a, 25b and 31. The compressor contactor 17 stays energized through contact 53 and a pump down pressure switch (PDP) 55. Holding relay 19 is energized through its own contacts 53 and the PDP 55. The HGS 32 is energized through contacts 31, contacts 53, and the PDP 55. Both LLS$_1$ 20 and LLS$_2$ 34, and the condenser fan contactor 23 de-energized because both contacts 25b and 27b open.

The unit is now effectively in a heating mode of operation with all liquid lines closed. The refrigerant is, therefore, pumped from the outdoor coil 16 and the indoor heat exchanger 22 via check valves 40 and 48. At the commencement of the next cooling (or heating cycle), all the refrigerant will be available to the active portions of the system.

After a heating mode of operation is terminated, the temporary heating pump down cycle is automatically initiated. The sequence of operation is exactly the same as in the cooling pump down. The only difference is that terminal W was not energized during the heating operation. This part of the circuit is, however, de-energized during the pump down cycle by contacts 41 regardless of the mode of operation. Since all the refrigerant is pumped into the indoor coil 18, all the refrigerant is available in the next heating (or cooling cycle) to the active portions of the system.

The heat pump of the present invention can be modified to operate as a water source heating heat pump with an outdoor air cooled condenser for the cooling mode. The unit so modified is similar to that described above in FIGS. 1A and 2 except that the DTS 11 and ATS 21 have been deleted as have the $LLS_1$ 34 and the check valve 26. Also check valve 42 and expansion valve 28 are not needed since the outdoor coil 18 now functions only as a condenser. The operating sequence for air source cooling and water source heating remain identical as described in connection with these sources of heating and cooling modes described above in connection with dual source operation.

The invention may be embodied in other specific forms without departing from the spirit or essential characteristics thereof. The present embodiments are, therefore, to be considered in all respects as illustrative and not restrictive. The scope of the invention being indicated by the appended claims rather than by the foregoing description, and all changes which come within the meaning and range of equivalency of the claims are therefore intended to be embraced therein.

What is claimed is:

1. A heat pump system for either heating or cooling an enclosed area, comprising:
   (a) a compressor means for compressing a refrigerant to be flowed through conduits of the system;
   (b) a reversing means for selecting the direction of the refrigerant flow through the system depending upon whether the system is operating in either its heating or cooling mode;
   (c) a first heat exchanger means located within the enclosed area for either heating or cooling the air to be circulated within said enclosed area;
   (d) an outdoor heat exchanger means acting either as an evaporator or a condenser depending upon whether the system is operating in either its heating or cooling mode;
   (e) a second indoor heat exchanger for providing an alternative source of heat to said outdoor heat exchanger means when the system is operating in its heating mode; and
   (f) a temperature discriminator means for automatically selecting either the outdoor heat exchanger means or the second indoor heat exchanger means as the operative means for exchanging heat with a source depending upon which source will provide more efficient operation for the system.

2. The system according to claim 1 wherein the source of heat for the outdoor heat exchanger means is the outside ambient air.

3. The system according to claim 1 wherein the source of heat for the second indoor heat exchanger means is water.

4. The system according to claim 1 further comprising valve means for isolating the inactive portions of the system from the active portions.

5. The system according to claim 1 further comprising pump down means for pumping virtually all the refrigerant into the first heat exchanger each time the system shuts down after either a heating or cooling cycle.

6. The system according to claim 1 wherein said second indoor heat exchange can also be operated during a cooling cycle for exchanging the heat in said refrigerant with a source of water whenever the temperature discriminator means determines that said water source will provide a more efficient cooling operation for the system than the outside ambient air.

7. A dual source heat pump system for either heating or cooling an enclosed area and utilizing either outside ambient air or water as a source for either cooling or heating, comprising:
   (a) a compressor means for compressing a refrigerant to be flowed through conduits of the system;
   (b) a reversing means for selecting the direction of the refrigerant flow through the system depending upon whether a heating or cooling operation has been selected;
   (c) an indoor heat exchanger means or either heating or cooling the air to be circulated within the enclosed area;
   (d) a second heat exchanger means located outside said enclosed area for exchanging heat between the refrigerant and the outside ambient air;
   (e) a third heat exchanger means for exchanging the between the refrigerant and a liquid source; and
   (f) means for automatically selecting whether said second or third heat exchanger means will function in cooperation with said first heat exchanger means depending upon the relative temperature of the outside ambient air and said liquid source.

8. The system according to claim 7 wherein said liquid source is a reservoir of water.

9. The system according to claim 7 further comprising valve means for isolating whichever of the second and third heat exchanger means has not been selected to function in cooperation with said first heat exchanger means.

10. The system according to claim 7 further comprising pump down means for pumping the refrigerant into the first heat exchanger means each time the system shuts down after a heating or cooling operation cycle.

11. The system according to claim 7 wherein both said first and second heat exchanger means comprise coils through which said refrigerant flows.

12. The system according to claim 7 wherein said third heat exchanger means comprises a coil through which said refrigerant flows and a means for flowing said liquid about said coil for exchanging heat with said refrigerant.

13. The system according to claim 12 wherein said liquid may be additionally heated by means of electric energy.

14. The system according to claim 12 wherein said liquid may be additionally heated by means of solar energy.

15. A method for heating or cooling the air within an enclosed area by means of a reversible refrigeration cycle wherein either air or liquid may be selectively chosen as a source for exchanging heat with a supply of refrigerant flowing through the system comprising:
   (a) passing refrigerant to a compressor for compression thereof;

(b) passing the compressed refrigerant to a reversing means for diverting said refrigerant to either an indoor heat exchanger means or to one of two other heat exchanger means depending upon whether the system is in its heating or cooling operation mode;

(c) utilizing said indoor heat exchanger means for condensing the refrigerant if the system is in its heating operation mode or evaporating the refrigerant if the system is in its cooling operation mode;

(d) selecting between each of the two other heat exchanger means for functioning in cooperation with said indoor heat exchanger means, depending upon the relative temperature of the sources for either of said other heat exchanger means;

(e) utilizing the one of said other heat exchanger means selected for evaporating said refrigerant if said system is in its heating operation mode or for condensing said refrigerant if said system is in its cooling operation mode;

(f) isolating the one of said other heat exchanger means which has not been selected for active operation in the system; and (g) passing said refrigerant between said indoor heat exchanger means and the selected one of the other heat exchanger means.

16. The method according to claim 15 further including the step of pumping the refrigerant into the indoor heat exchanger means each time the system shuts down after an operational mode.

17. The method according to claim 15 wherein a first of said other heat exchanger means utilizes outside ambient air as a source for exchanging heat with said refrigerant.

18. The method according to claim 17 wherein a second of said other heat exchanger means utilizes liquid as a source for exchanging heat with said refrigerant.

19. The method according to claim 18 wherein said liquid source of said other heat exchanger means may be additionally heated by means of electric energy.

20. The method according to claim 18 wherein said liquid source of said other heat exchanger means may be additionally heated by means of solar energy.

* * * * *

UNITED STATES PATENT AND TRADEMARK OFFICE
CERTIFICATE OF CORRECTION

PATENT NO. : 4,179,894
DATED : December 25, 1979
INVENTOR(S) : HUGH M. HUGHES

It is certified that error appears in the above—identified patent and that said Letters Patent is hereby corrected as shown below:

Column 2, line 53, "spce" should read -- space --;

Column 3, line 31, "the" (second occurrence) should read -- The --;

Column 6, line 15, "the" should read -- The --;

Column 8, line 7, "exchange" should read -- exchanger --;

Column 8, line 23, "or" should read -- for --; and

Column 8, line 29, "the" should read -- heat --.

Signed and Sealed this

Fifteenth Day of April 1980

[SEAL]

Attest:

SIDNEY A. DIAMOND

Attesting Officer

Commissioner of Patents and Trademarks